(12) United States Patent
Goldman et al.

(10) Patent No.: US 12,709,234 B2
(45) Date of Patent: Aug. 18, 2026

(54) VEHICLE RACK

(71) Applicant: Drop IN Racks LLC, Aspen, CO (US)

(72) Inventors: Daniel Goldman, Snowmass Village, CO (US); Carl Walker, Aspen, CO (US)

(73) Assignee: Drop IN Racks LLC, Aspen, CO (US)

( * ) Notice: Subject to any disclaimer, the term of this patent is extended or adjusted under 35 U.S.C. 154(b) by 222 days.

(21) Appl. No.: 18/347,020

(22) Filed: Jul. 5, 2023

(65) Prior Publication Data

US 2024/0067099 A1 Feb. 29, 2024

Related U.S. Application Data

(60) Provisional application No. 63/374,146, filed on Aug. 31, 2022.

(51) Int. Cl.
*B60R 9/08* (2006.01)
*B60R 9/06* (2006.01)

(52) U.S. Cl.
CPC . *B60R 9/08* (2013.01); *B60R 9/06* (2013.01)

(58) Field of Classification Search
CPC .................................... B60R 9/06; B60R 9/08
USPC .......................................................... 224/400
See application file for complete search history.

(56) References Cited

U.S. PATENT DOCUMENTS 2,106,503 A 1/1938 Hendrick
2,220,292 A 11/1940 Werner
4,415,092 A * 11/1983 Boyer .................. B43K 23/001 401/88
4,785,980 A 11/1988 Redick
4,871,099 A * 10/1989 Bogar, Jr. .............. A01K 97/10 248/512
4,953,773 A * 9/1990 Wirth .................. A63C 11/027 294/147
5,449,100 A 9/1995 Eckhart
5,454,496 A * 10/1995 Sumida, Jr. .............. B60D 1/42 224/532
5,527,146 A 6/1996 Allsop et al.
5,547,116 A 8/1996 Eckhart
5,806,737 A * 9/1998 Clark ........................ B60R 9/06 224/527
5,842,615 A 12/1998 Goodness
5,992,720 A 11/1999 Miller
6,085,954 A * 7/2000 Bloemer ................... B60R 9/06 224/532
6,237,823 B1 * 5/2001 Stewart ................... B60R 9/065 224/523
6,547,112 B2 * 4/2003 Gallagher .............. B60R 11/00 224/407
6,701,913 B1 * 3/2004 LeDuc ...................... B60R 9/06 126/30

(Continued)

FOREIGN PATENT DOCUMENTS

DE 202016000494 U1 5/2016

*Primary Examiner* — Peter N Helvey
(74) *Attorney, Agent, or Firm* — Husch Blackwell LLP

(57) ABSTRACT

The present disclosure relates to a vehicle rack configured to be mounted to the rear of a vehicle. The vehicle rack includes a plurality of receptacles configured to house recreational items, such as skis or snowboards. The plurality of receptacles are coupled to the vehicle by a hitch arm. The hitch arm and plurality of receptacles form a pivot point so that the plurality of receptacles and be pivoted with respect to the hitch arm and the vehicle.

18 Claims, 7 Drawing Sheets

(56) References Cited

U.S. PATENT DOCUMENTS

| | | | |
|---|---|---|---|
| 7,261,228 | B2 | 8/2007 | Prescott et al. |
| 7,611,035 | B2 | 11/2009 | Settelmayer et al. |
| 8,590,758 | B2 * | 11/2013 | Gray ........................ B60R 9/08 224/532 |
| 8,726,552 | B2 * | 5/2014 | Larsen .................... G09F 21/04 40/591 |
| 9,211,846 | B2 | 12/2015 | Donnigan |
| 9,475,353 | B2 * | 10/2016 | Mehlen ................... B60R 9/065 |
| 10,058,086 | B1 * | 8/2018 | Mooney ................. A01K 97/10 |
| 10,501,023 | B1 * | 12/2019 | Mayers ..................... B60R 9/10 |
| 10,668,866 | B2 | 6/2020 | Kuschmeader et al. |
| 11,220,303 | B2 * | 1/2022 | Wronski ................ B62D 43/02 |
| 11,702,014 | B2 * | 7/2023 | Wronski ................... B60R 9/06 224/509 |
| 12,187,234 | B2 * | 1/2025 | Bowles ..................... B60R 9/10 |
| 2005/0205630 | A1 | 9/2005 | Cooper et al. |
| 2007/0187447 | A1 | 8/2007 | Hamann |
| 2016/0068110 | A1 | 3/2016 | Prescott et al. |
| 2016/0250976 | A1 * | 9/2016 | Ammirati ............. B60R 9/0485 224/502 |
| 2018/0345744 | A1 * | 12/2018 | Rodriguez ................ B60R 9/06 |
| 2018/0345872 | A1 * | 12/2018 | Kraeuter ................... B60R 9/06 |
| 2019/0161022 | A1 * | 5/2019 | McFadden ................ B60R 9/06 |
| 2022/0153205 | A1 | 5/2022 | Kuschmeader et al. |
| 2022/0194302 | A1 * | 6/2022 | Myers ....................... B60R 9/06 |
| 2022/0297612 | A1 * | 9/2022 | Woods ...................... B60R 9/06 |
| 2023/0192005 | A1 * | 6/2023 | Olsen ...................... B60R 9/045 224/519 |

* cited by examiner 10
25
20
15
30
40
35
V

VEHICLE RACK

CROSS-REFERENCE TO RELATED APPLICATIONS

The present application claims priority to U.S. Provisional Patent Application No. 63/374,146, filed Aug. 31, 2022, the entire contents of which are hereby incorporated by reference.

FIELD OF INVENTION

The present disclosure relates generally to racks that can be mounted to the rear of a vehicle and configured to hold recreational items such as skis and snowboards.

BACKGROUND OF THE INVENTION

Vehicle carrier racks can be mounted on the exterior of vehicles to transport any variety of recreational items, including skis, snowboards, water skis, wakeboards, surfboards, and the like. Carrier racks are typically mounted to the roof, trunk, or rear hitch of a vehicle. Such rear-mounted racks are advantageous in that they allow easy access to the stowed items, are easier to load, and do not cause drag associated with roof-top carriers. However, rear-mounted carriers can, in some circumstances, inhibit access to the rear of the vehicle.

SUMMARY OF INVENTION

The present disclosure relates generally to a vehicle rack intended to be mounted to the rear of a vehicle. The rack generally includes a planar base to which at least one receptacle is coupled. The receptacle is intended to hold at least one recreational item (for example, a ski or snowboard). The planar base is coupled to a hitch arm via a pivot portion. The pivot portion allows the receptacle to be pivoted. In one embodiment, the receptacle is pivoted rearward to allow access to the rear of the vehicle without the need to detach the rack from the vehicle. The rack provided herein has enhanced customization, in that a user can determine to which vehicle side the rack is offset, the degree of offset, the proximity of the rack to the rear bumper of the vehicle, and the height of the rack from the ground. This degree of customization allows optimization of the rack location depending on user preference and car design (e.g., rear camera location, exhaust location, ability to open vehicle trunk without pivoting, preference for overall car length, etc.). Thus, in some embodiments, the rack can be customized to be positioned to allow trunk access without requiring the rack to pivot.

These and other aspects and advantages of the present invention will become apparent to those skilled in the art after considering the following detailed description in connection with the accompanying drawings.

BRIEF DESCRIPTION OF DRAWINGS

FIG. 2 is a perspective view of the vehicle rack of FIG. 1 in a pivoted position.

Figure 1:
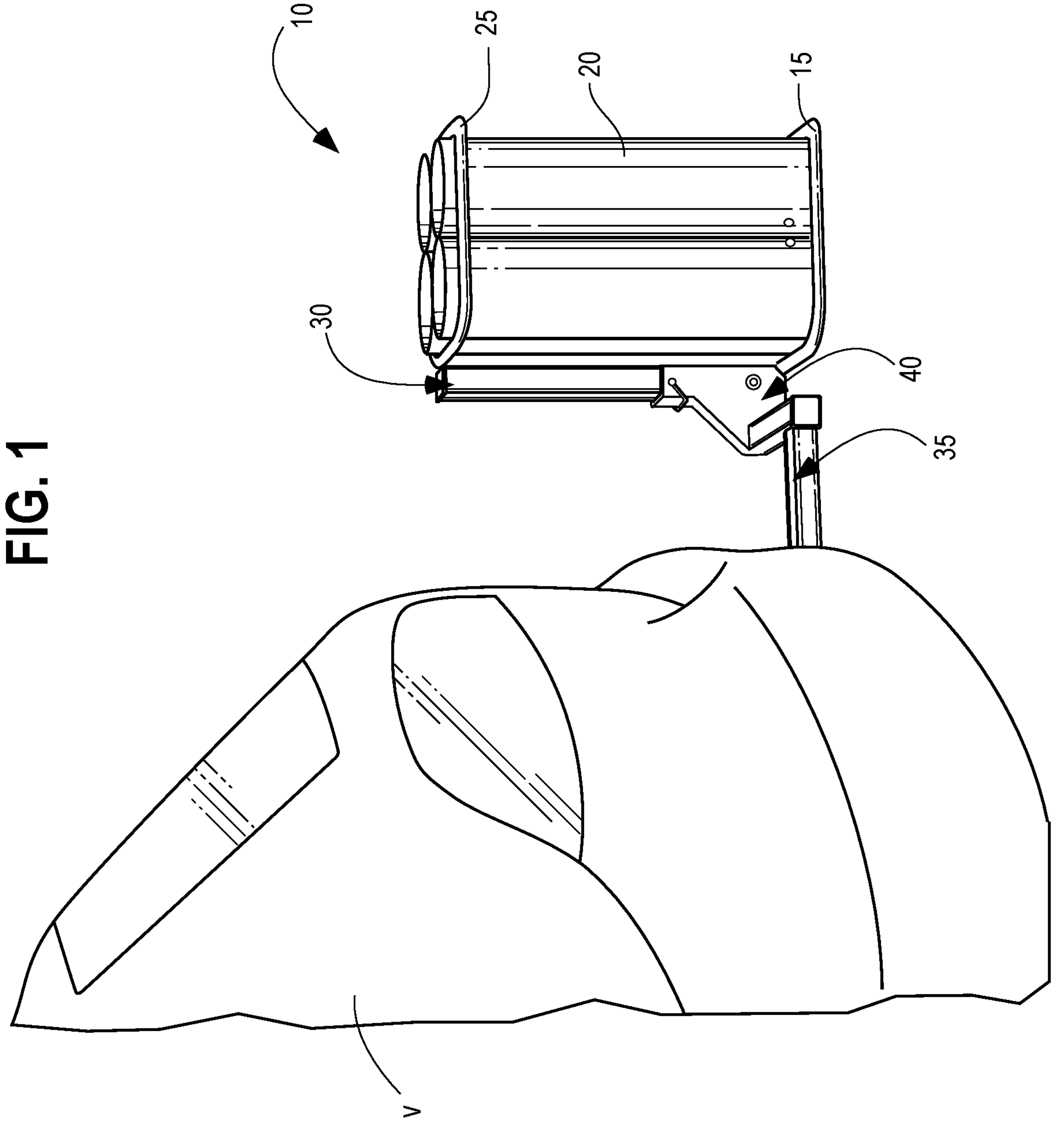
FIG. 1 is a perspective view of a vehicle rack mounted to the rear of a vehicle according to one embodiment of the present disclosure.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Referring now to FIG. 1, the present disclosure generally relates to a vehicle rack generally indicated at reference numeral 10. The rack 10 can generally include a planar base 15 and at least one receptacle (e.g., drum) 20 configured to house a recreational item. Typically, the receptacle 20 is open on its top end to allow access to its interior volume. A cover (not shown) can be provided to place over the top end of the receptacle 20 to fully contain the items placed therein.

A containment ring 25 is preferably coupled to the top end of the receptacle 20. The rack 10 also comprises a vertically oriented adjustment arm 30 that substantially runs the height of the receptacle 20. The adjustment arm 30 allows for the adjustment of the vertical position of the rack 10. Typically, the adjustment arm 30 is coupled to the base 10 on one end and the containment ring 25 on its other end. A hitch arm 35 can be coupled to the adjustment arm 30 on one end and configured to be coupled to a vehicle V (e.g., vehicular hitch) on the other end. The hitch arm 35 includes multiple attachment locations for customization of how close the rack 10 is to the rear of the vehicle V as well as multiple attachment locations for the adjustment arm 30 to determine the degree of offset of the hitch arm 35 with the base 15. Rotation of the hitch arm 35 allows for adjustment of the location of the rack 10 as between the driver and passenger side of the vehicle V. Accordingly, the illustrated embodiment includes at least 72 customization options (three different heights of the planar base 15, ability to flip from driver to passenger side, four different distances from the vehicle rear, three offsets from center).

Figure 2:
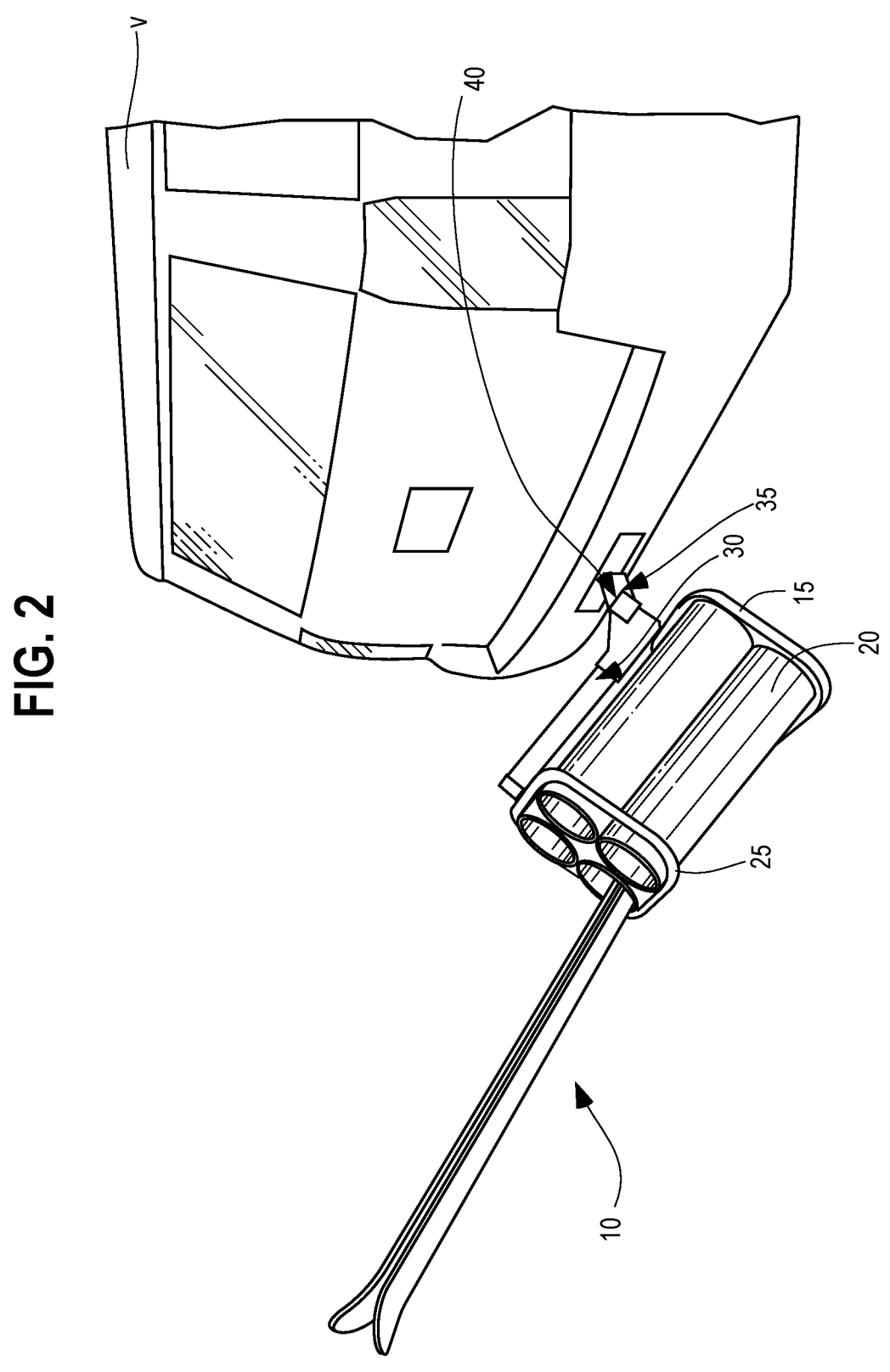

In some embodiments, a pivot portion 40 can couple the hitch arm 35 to the adjustment arm 30. As illustrated in FIG. 2, the pivot portion 40 may allow the base 15 and the drums 20 to pivot in a particular direction (for example, in the illustrated embodiment, backwards). In some embodiments, pivoting the rack 10 may allow for easier access to the rear of the vehicle V.

Figure 3:
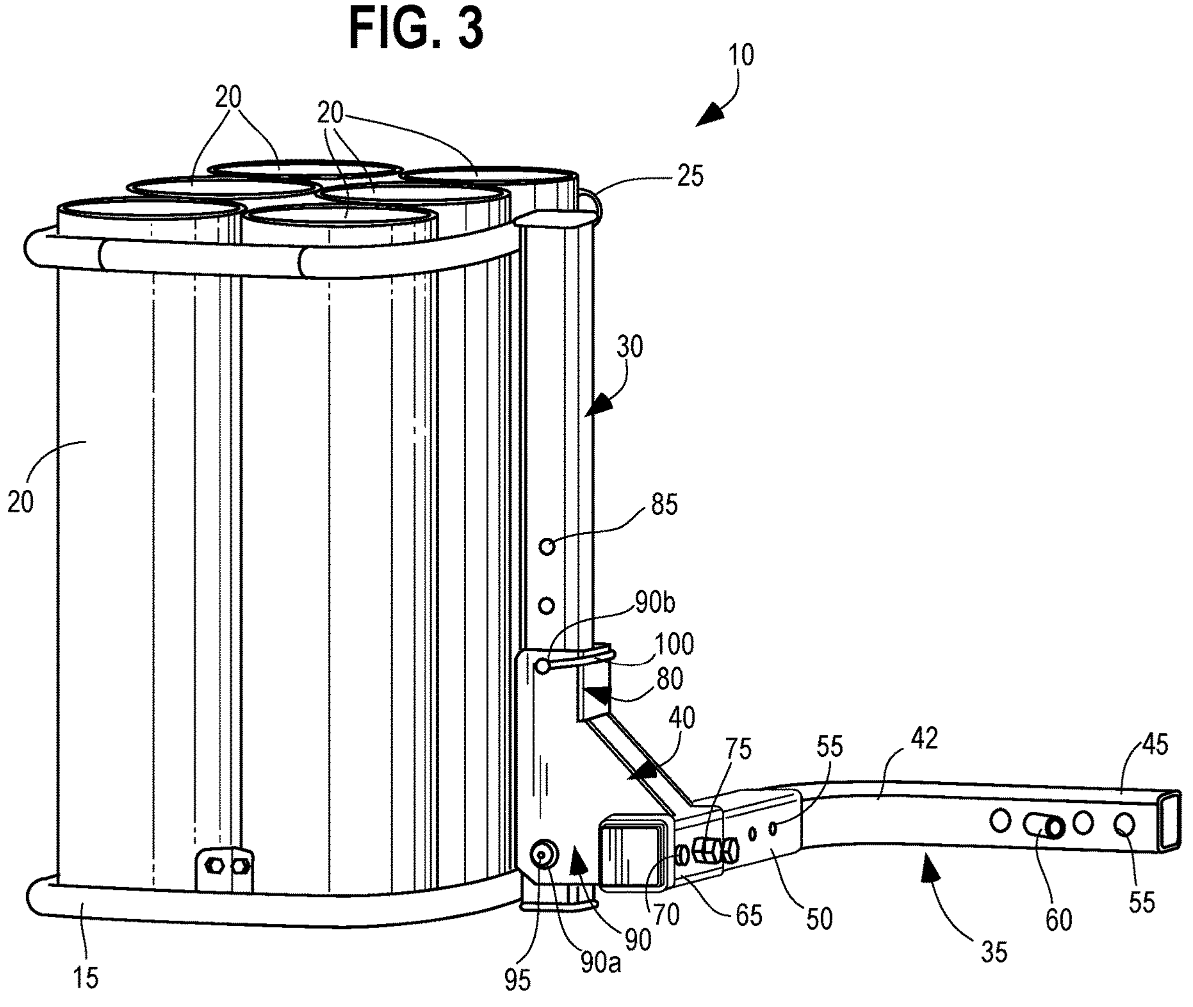
FIG. 3 is a perspective view of another embodiment of a vehicle rack in an upright position and disengaged from the rear of a vehicle.

Turning now to FIG. 3, the hitch arm 35 generally comprises a rectangular-shaped channel having a central bend 42. In this way, the distal portion 45 nearest the vehicle V is perpendicular to the proximal portion 50 nearest the pivot portion 40, thus making it substantially "L-shaped." The hitch arm 35 is configured to be rotatable by 180 degrees so that the bend 42 can direct the proximal portion 50 to either the driver or passenger side of the vehicle V.

Each of the distal portion 45 and the proximal portion 50 can include through openings 55. The openings 55 of the distal portion 45 can engage hitch hardware 60 (e.g., a bent pin) used to secure the rack 10 to a hitch mount of a vehicle, as known and understood in the art.

The pivot portion 40 can include a rectangular channel 65 sized to slide over the proximal portion 50 of the hitch arm 35. The channel 65 can include openings 70 that are alignable with the openings 55 of the proximal portion 50 of the hitch arm 35. Fasteners 75 can be inserted through openings 55 and 70 to couple the pivot portion 40 to the hitch arm 35. The pivot portion 40 can include a second channel 80 (for example, a U-shaped or C-shaped channel) that is sized and shaped to be received over the adjustment arm 30.

The adjustment arm 30 can also include openings 85 that are alignable with openings 90 of the second channel 80 of the pivot portion 40. In embodiments where the adjustment arm 30 includes more than two openings, the height of the pivot portion 40 can be adjusted on the adjustment arm 30 to change the height of the base 15. Typically, the second channel 80 includes at least two openings 90. A first opening **90*a* can receive a fixed fastener 95 (e.g., a nut and bolt). A second opening 90*b* can typically receive another fastener 100**.

Figure 4:
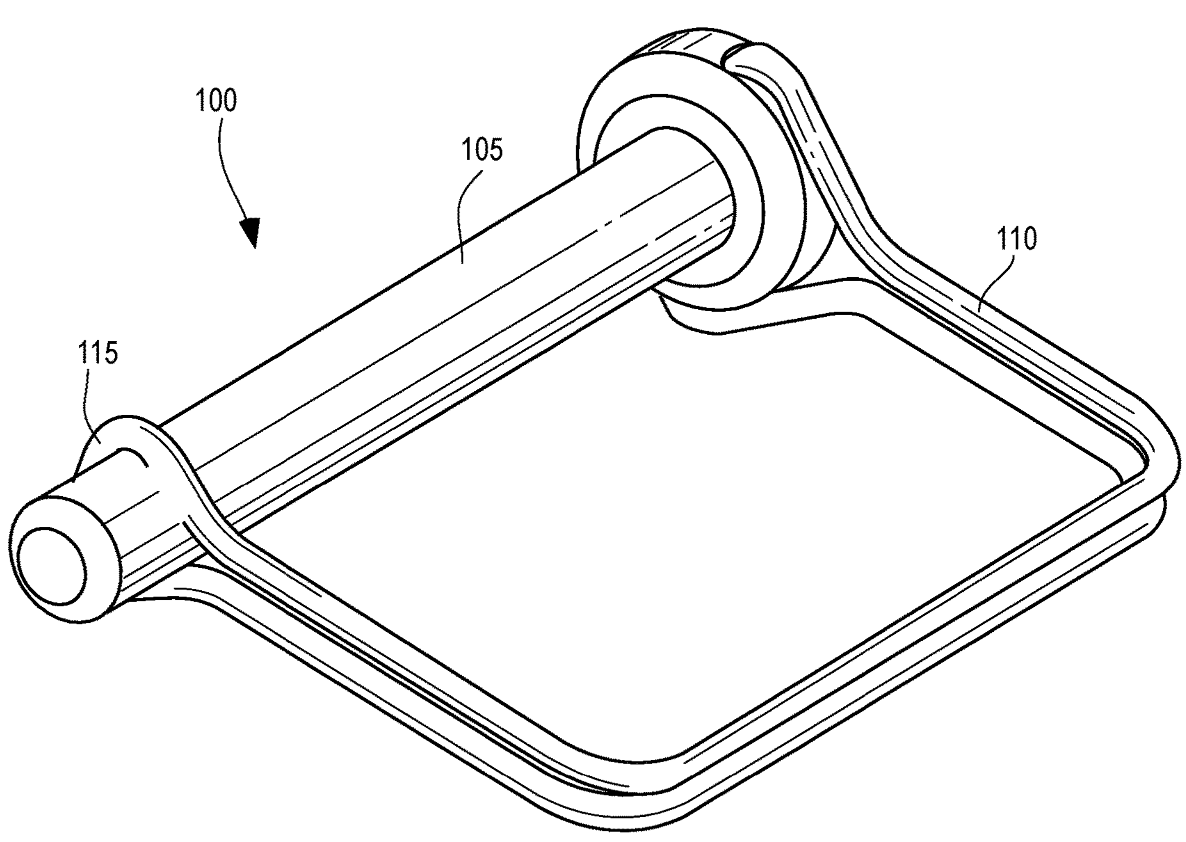
FIG. 4 is a perspective view of a pin fastener used with the vehicle racks of the present disclosure.

In one embodiment, fastener 100 can be a quick release fastener. With reference to FIG. 4, the illustrated fastener 100 comprises a pin 105 inserted through openings 85, **90*b*. A clasp 110 can be fixedly coupled to one end of the pin 105 and include an opening 115 on the other end to receive the pin 105 therein. Alternatively, each end of the clasp 110 can include openings 115 to receive the pin 105 therein. The clasp 110 can be generally C-shaped or U-shaped so that it abuts the outer edges of the second channel 80**.

Figure 5:
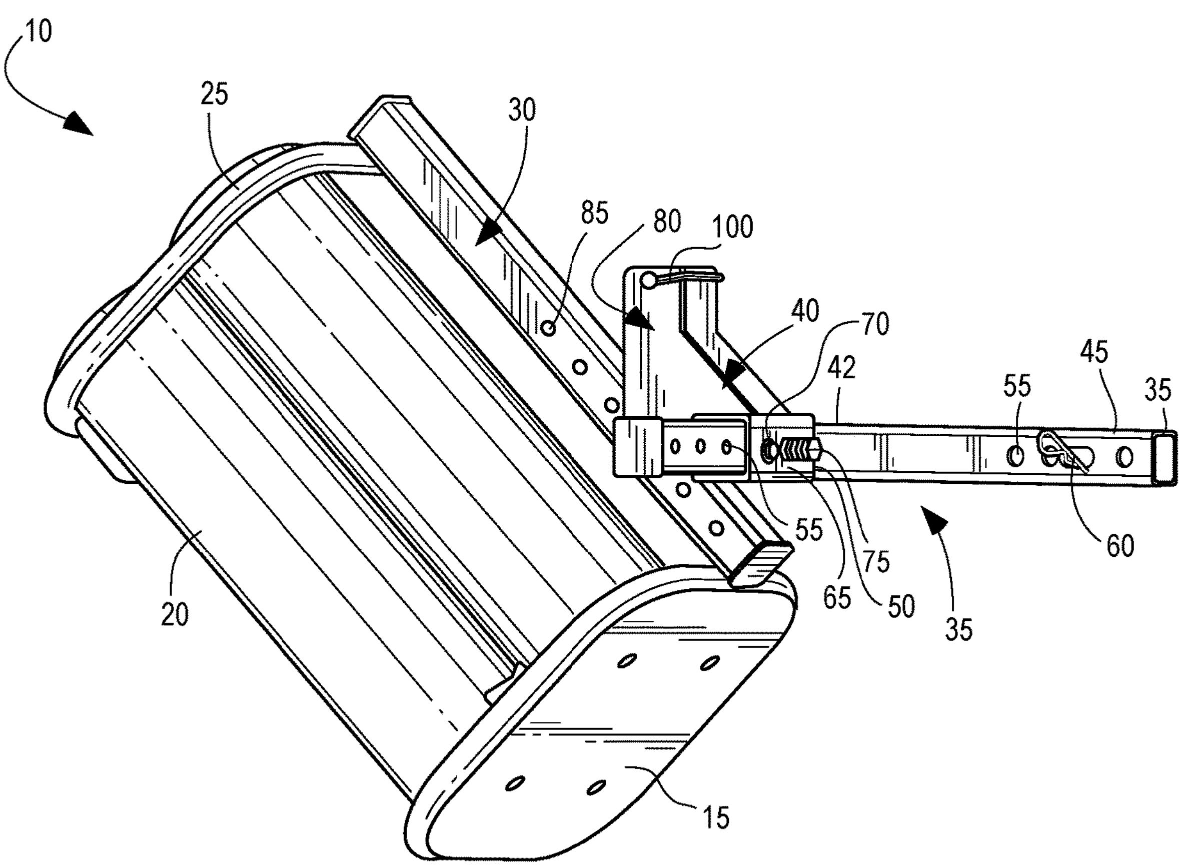
FIG. 5 is a perspective view of another embodiment of a vehicle rack in a pivoted position and disengaged from the rear of a vehicle.

As illustrated in FIG. 5, once the upper fastener 100 is disengaged from the openings 85 of the adjustment arm 30, the engaged fastener 95 forms a pivot point and the adjustment arm 30 and all structures attached thereto, including the base 15 and the receptacles 20 are allowed to pivot. In the illustrated embodiment, because the second channel 80 faces the rear of the vehicle V, the adjustment arm 30 pivots backwards. However, the skilled person will understand that the adjustment arm 30 may pivot in other directions depending on the location of the second channel 80.

Figure 6:
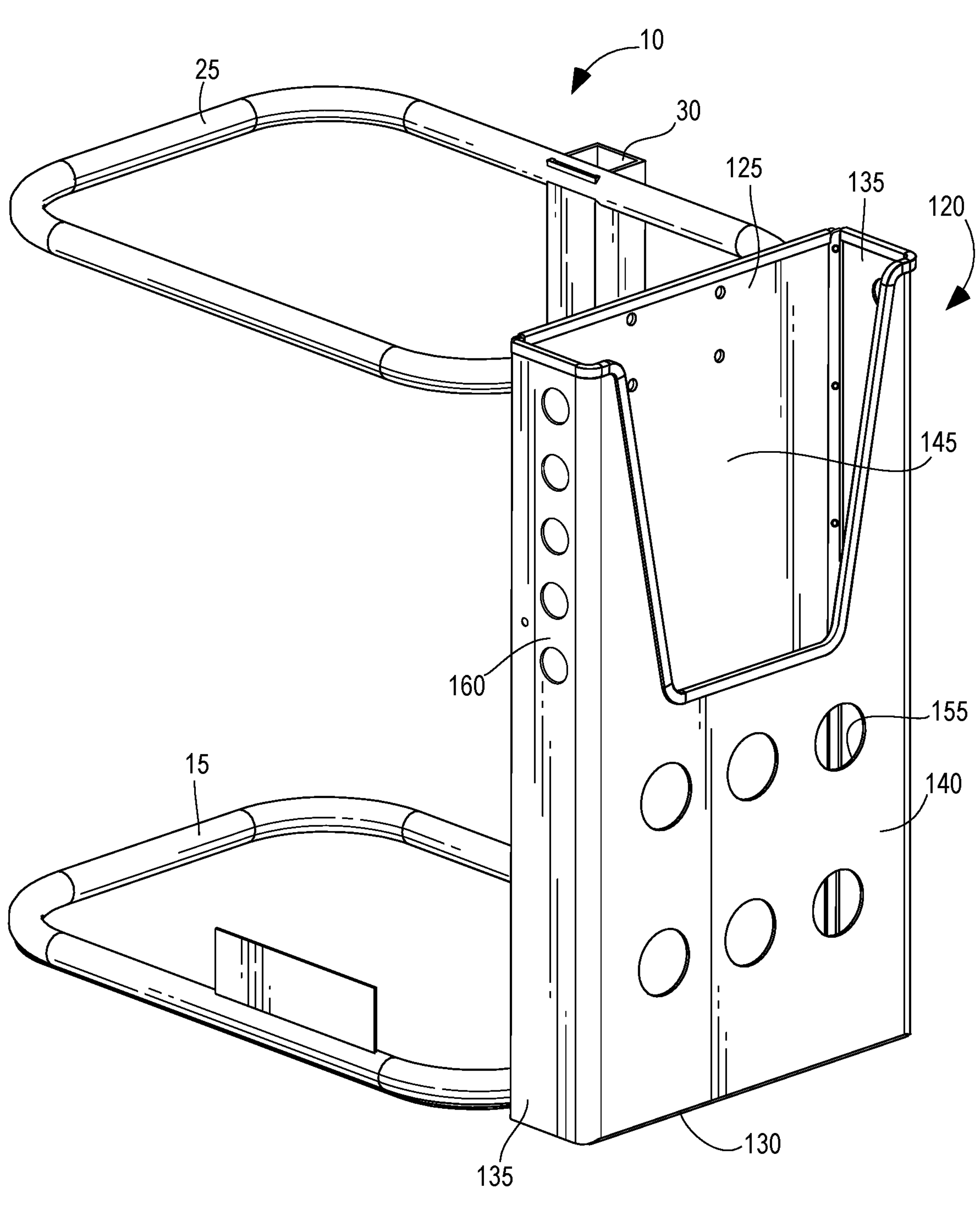
FIG. 6 is a perspective view of another embodiment of a vehicle rack with a sleeve portion.

Turning now to FIG. 6, the rack 10 can include a sleeve 120 coupled to the containment ring 25 and base 15. The sleeve generally comprises a planar back face 125 adjacent the containment ring 25 and base 15, a bottom face 130 adjacent to and generally perpendicular to the back face 125, which may, in some embodiments be planar with or parallel to the base 15, two side faces 135, and a generally planar front face 140, which may, in some embodiments, be generally parallel with the back face 125. The top of the sleeve 120 may be open. Thus, the sleeve 120 can be generally in the shape of an open-topped rectangle, although other shapes are also foreseen. The sleeve 120 can be sized and shaped to receive a standard snowboard, although other sizes and shapes are also foreseen.

The front face 140 can include a cut-out portion 145 along an upper edge thereof, the cut-out portion 145 being configured to allow easier access to the items contained within sleeve 120. The front face 140 may also include one or more openings 155 on a portion thereof. The side faces 135 may also include one or more openings 160 on a portion thereof, for example, as illustrated, on an upper portion thereof. Although not shown in the illustrated embodiment due to perspective, the bottom face 130 may also include one or more openings.

Figure 7:
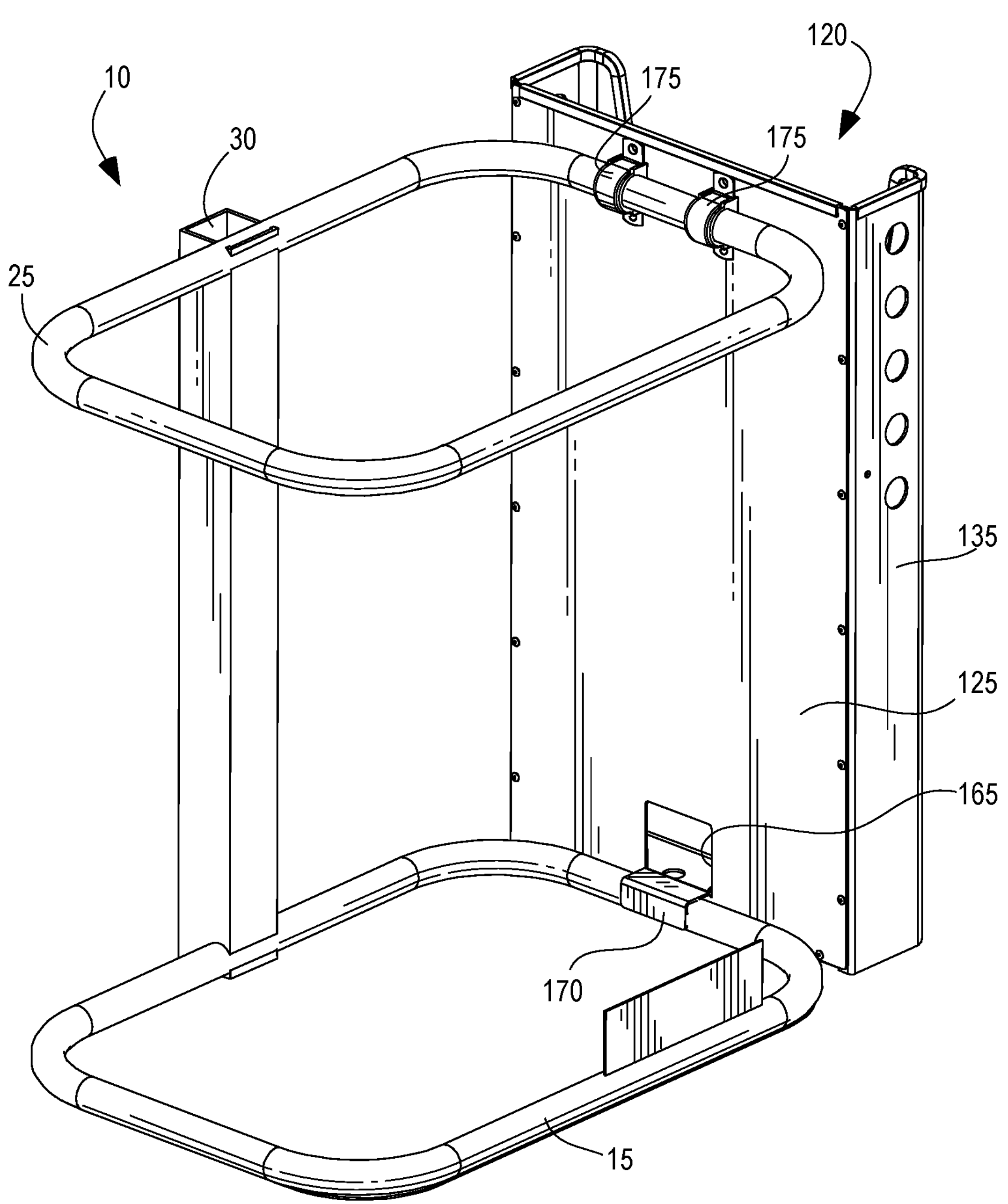
FIG. 7 is another perspective view of the vehicle rack of FIG. 6.

As illustrated in FIG. 7, the back face 125 of the sleeve 120 may include an opening 165 on a lower portion thereof, for example, along the lower edge. Although the opening 165 is rectangular in FIG. 7, it can be of an appropriate size and shape. The opening 165 can receive a clamp 170 coupled to the base 15 on one end thereof and the bottom face 130 on the other end thereof. A top portion of the back face 125 of the sleeve 120 can receive one or more clamps 175 placed around or otherwise coupled to the containment ring 25 and fastened to the back face 125 by one or more fastening members. The clamps 175 can be, for example, vibration damping clamps. Thus, the sleeve 120 can be received on any of the three open sides of the containment ring 25.

As can be seen from the illustrated embodiments, any number of receptacles 20 can be included, for example, one, two, three, four, five, six, seven, eight, nine, ten, or more receptacles can be included. The receptacles 20 can be the same or different sizes and/or shapes. For example, in one embodiment, one receptacle 20 is sized to hold skis and another receptacle 20 is sized to hold a snowboard. Any type of item can be housed in the receptacle 20. Typically, the items are recreational in nature and can include, without restriction, skis, snowboards, water skis, wakeboards, skateboards, surfboards, paddle boards, and any other acceptable item known in the art. The receptacles 20 can be constructed of any acceptable material known in the art, for example, metal or plastic. In one embodiment, the receptacles 20 are constructed of high-density polyethylene (HDPE). The illustrated embodiment includes cylindrical receptacles, but any shape of receptacle can be used, for example, rectangular.

As is evident from the foregoing description, certain aspects of the present invention is not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations and other uses in applications which do not depart from the spirit and scope of the present inventions are deemed to be covered by the inventions which are limited only by the claims which follow.

What is claimed is:

1. A rack for attachment to a vehicle, the rack comprising:

a plurality of receptacles;

a vertical adjustment arm coupled to the plurality of receptacles; and a hitch arm including a first portion coupled to the vertical adjustment arm proximate a first end of the hitch arm via a pivot portion;

wherein a second portion of the hitch arm proximate a second end of the hitch arm is configured to be engaged with a vehicle;

wherein the first portion and the second portion of the hitch arm generally define an L-shape;

wherein the second portion of the hitch arm is adjustable relative to the vehicle to adjust a distance between the first portion of the hitch arm and the vehicle and to selectively bias the first portion of the hitch arm toward a driver side of the vehicle or toward a passenger side of the vehicle;

wherein the plurality of receptacles can be selectively pivoted relative to the hitch arm about a pivot point between the vertical adjustment arm and the pivot portion;

wherein the pivot portion is moveable along the first portion of the hitch arm to adjust a lateral position of the plurality of receptacles and the vertical adjustment arm relative to the hitch arm; and wherein the pivot portion is releasably couplable with the vertical adjustment arm at an engagement point above the pivot point.

2. The rack of claim 1, wherein the plurality of receptacles are received on a planar base.

3. The rack of claim 2, wherein the base is coupled to the hitch arm.

4. The rack of claim 2, wherein a first end of the plurality of receptacles are contained within a containment ring.

5. The rack of claim 4, wherein the vertical adjustment arm is coupled to the base and to the containment ring.

6. The rack of claim 5, wherein the vertical adjustment arm comprises a plurality of openings configured to receive a fastener and allow for vertical adjustment of the rack relative to the hitch arm.

7. The rack of claim 6, wherein the plurality of receptacles and the vertical adjustment arm are configured to pivot relative to the pivot portion and the hitch arm.

8. The rack of claim 7, wherein a first opening of the pivot portion is configured to align with one of the plurality of openings of the vertical adjustment arm at the engagement point and a second opening of the pivot portion is configured to align with another of the plurality of openings of the vertical adjustment arm at the pivot point, wherein fasteners are received through the first opening of the pivot portion and the second opening of the pivot portion to couple the pivot portion to the vertical adjustment arm, and wherein the first opening of the pivot portion is vertically above the second opening of the pivot portion.

9. The rack of claim 8, wherein the fastener received through the first opening of the pivot portion is a quick release fastener.

10. The rack of claim 9, wherein the fastener received through the second opening of the pivot portion is a fixed fastener.

11. The rack of claim 9, wherein the quick release fastener comprises a clasp having openings on a first end and a second end, wherein a pin is fixedly received on one of the first end opening and the second end opening and releasably received on the other of the first end opening and the second end opening.

12. The rack of claim 8, wherein the plurality of receptacles is configured to pivot away from the hitch arm upon release of the fastener received through the first opening of the pivot portion.

13. A container system comprising:

a plurality of containers; and a hitch arm including a first portion coupled to the plurality of containers proximate a first end of the hitch arm via a pivot point;

wherein a second portion of the hitch arm proximate a second end of the hitch arm is configured to be engaged with a vehicle;

wherein the first portion and the second portion of the hitch arm generally define an L-shape and the first portion of the hitch arm is laterally offset from the second portion of the hitch arm when the second end of the hitch arm is engaged with the vehicle such that the plurality of containers is biased toward a driver side of the vehicle or a passenger side of the vehicle;

wherein the second portion of the hitch arm is adjustable relative to the vehicle to adjust a distance between the first portion of the hitch arm and the vehicle and to selectively bias the first portion of the hitch arm toward the driver side of the vehicle or toward the passenger side of the vehicle;

wherein the plurality of containers is configured to pivot relative to the hitch arm about a pivot axis of the pivot point between: a first configuration, wherein the plurality of containers is generally upright, and a second configuration, wherein the plurality of containers is rotated outwardly and away from the vehicle; and wherein the plurality of containers is adjustable relative to the hitch arm in a lateral direction generally parallel to the pivot axis and in a vertical direction generally perpendicular to the lateral direction.

14. The system of claim 13, wherein the plurality of containers is received on a planar base coupled to the hitch arm.

15. The system of claim 14, wherein a first end of the plurality of containers is contained within a containment ring and wherein a vertical adjustment arm is coupled to the base and to the containment ring.

16. The system of claim 15, wherein the vertical adjustment arm comprises a plurality of openings configured to receive a fastener and allow for vertical adjustment of the plurality of containers relative to the hitch arm.

17. The system of claim 16, wherein the hitch arm is coupled to the plurality of containers via a pivot portion configured to pivot relative to the hitch arm to allow the plurality of containers to adjust from the first configuration to the second configuration.

18. The rack of claim 1, wherein:

the pivot portion comprises a first channel sized to slide over the first portion of the hitch arm and a second channel configured to receive the vertical adjustment arm, the first channel includes a plurality of first openings alignable with a corresponding plurality of through openings in the first portion of the hitch arm, the second channel includes a lower opening and an upper opening, each of the lower opening and the upper opening being alignable with corresponding openings in the vertical adjustment arm, each aligned pair of a first opening of the plurality of first openings and a through opening of the plurality of through openings is configured to receive a fastener to secure the pivot portion at a corresponding position along the first portion of the hitch arm for adjusting the lateral position of the plurality of receptacles, a fixed fastener is inserted through the lower opening of the second channel to pivotably couple the pivot portion to the vertical adjustment arm, the fixed fastener defines the pivot point, a releasable fastener is inserted through the upper opening of the second channel to releasably couple the pivot portion to the vertical adjustment arm, and the releasable fastener defines the engagement point.

* * * * *